Patented July 6, 1943

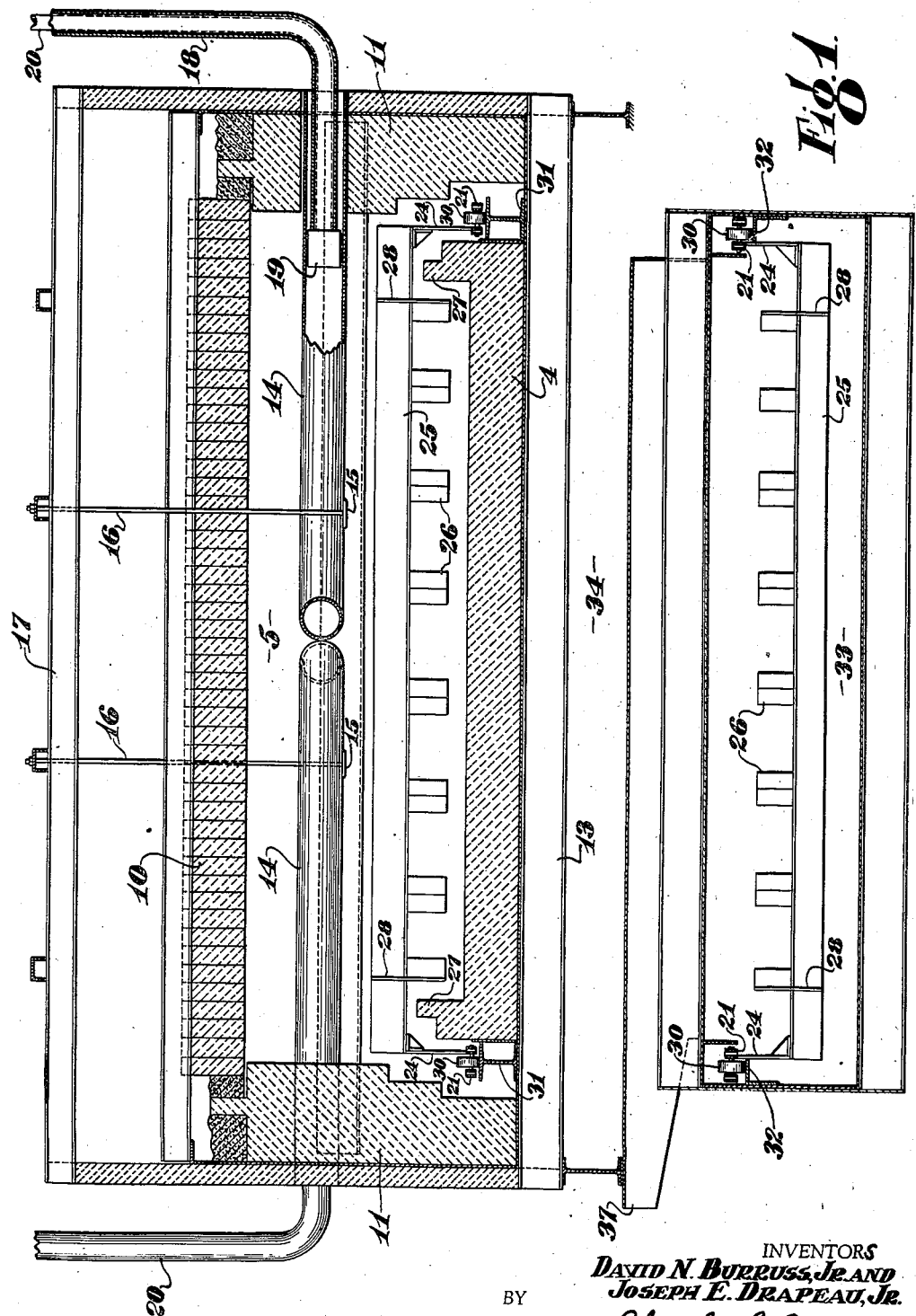

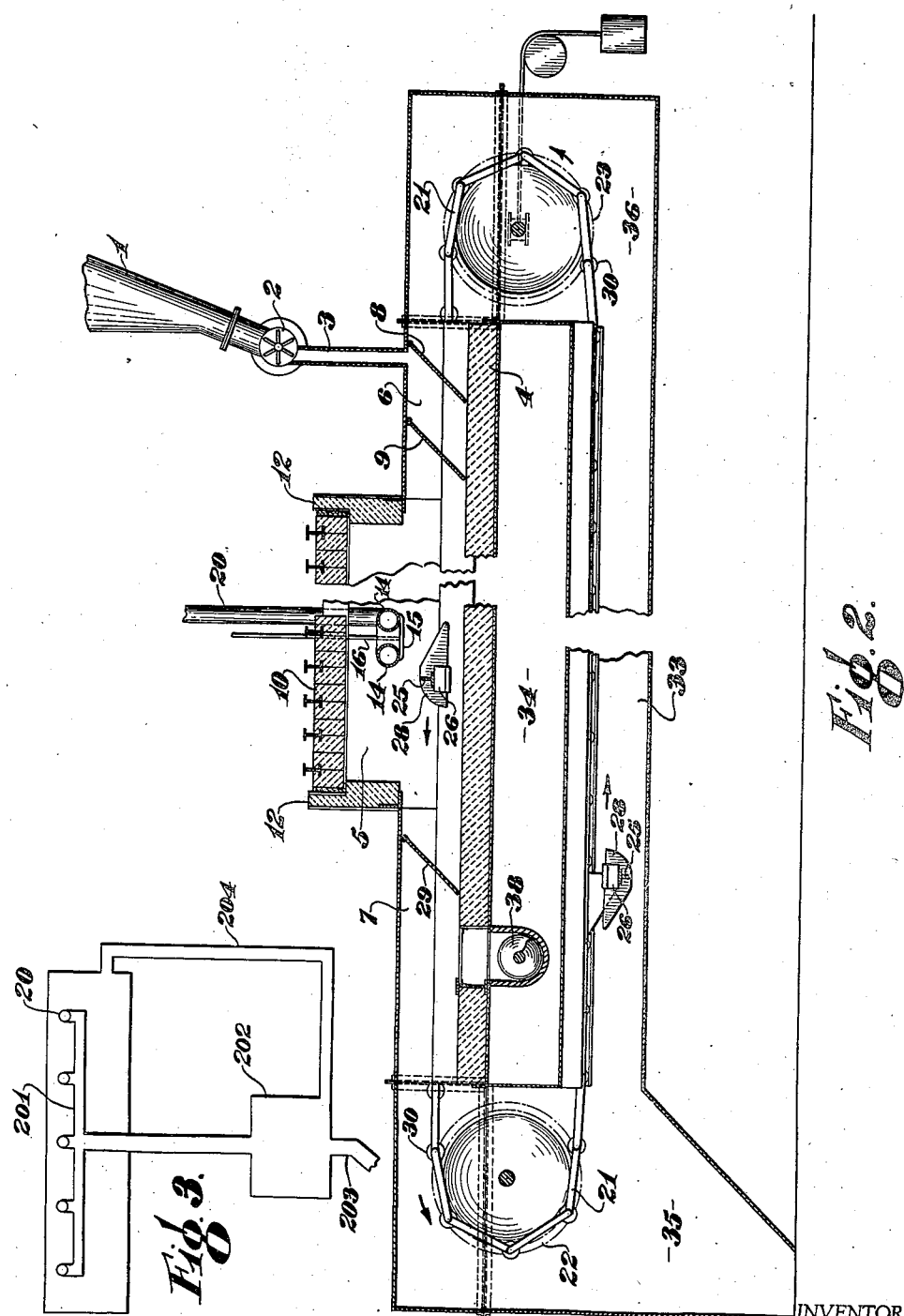

2,323,305

UNITED STATES PATENT OFFICE 2,323,305

REDUCING APPARATUS

David N. Burruss, Jr., Hammond, Ind., and Joseph E. Drapeau, Jr., Calumet City, Ill., assignors to The Glidden Company, Cleveland, Ohio, a corporation of Ohio Application March 29, 1941, Serial No. 385,782

9 Claims. (Cl. 266—24)

The present invention relates to the art of reduction of metal oxides and particularly relates to the apparatus for producing metal powders or sponge, such as copper and iron powders or sponge by reduction from oxides.

The invention has for its main object the production of metal sponge or powder by improved apparatus and methods whereby the sponge or powder may be continuously produced.

Apparatus and methods for the continuous production of sponge iron and iron powder have been proposed heretofore, but these have not been commercially successful due to mechanical difficulties which develop after the operation has run a short while. As a result the only commercial source of sponge iron has been that produced from high grade Swedish ore produced by a batch process, which is not only time consuming but technically inefficient.

It is accordingly a special object of the present invention to provide an apparatus suitable for continuously producing sponge iron and iron powder which is substantially free from the inherent development of mechanical difficulties after relatively short periods of operation.

In order that the invention may be clearly understood it will be more fully described with reference to the accompanying drawings in which:

Figure I is a transverse cross section of the furnace.

Figure II is a broken longitudinal cross section of the furnace.

Figure III is a diagrammatic drawing of a modification.

Referring to the drawings: 1 represents a hopper for storing the charge. A feed device 2 is provided for regulating the rate at which the charge is fed through conduit 3 onto the stationary hearth 4, forming the bottom of the reducing chamber 5, and which extends into the preheating zone 6 at the feed end and into a discharging zone 7 at the discharge end of the furnace. Doors 8 and 9 are provided, one on each side of the discharge end of conduit 3, which are hingedly mounted at their upper ends and so arranged to rest upon the hearth 4, or upon the charge thereon, when in closed position, and so mounted to be raised by means mounted on the conveying mechanism, to be described, and to fall back in closed position by gravity.

The reducing chamber 5 is provided with a heat insulated top 10, heat insulated side walls 11, and heat insulated end portions 12. The hearth which forms the bottom of the reducing chamber is composed of a refractory heat conducting material such as high heat conductivity brick. The hearth is supported directly upon the structural supporting members 13 of the furnace, so that it is exposed to direct heat radiation to the atmosphere. By this arrangement the hearth is maintained relatively cool and thereby aids in preventing sintering of the charge.

Members 14 are U shaped gas fired radiant combustion tubes, and are supported in the reducing chamber 5 by means of cradles 15, which are in turn supported by rods 16 carried by the superstructure 17. A combustible mixture of gas is introduced through inlet 18, burnt in burner 19 located in one arm of the U tube 14, and the burnt gases after passing through the combustion tube are exhausted through exhaust 20. In the form shown each combustion tube extends half way into the furnace from the sides, and they are alternately arranged on each side of the furnace. The combustion tubes are of such capacity and are provided in sufficient number to produce the necessary temperature, and other arrangements of the tubes as well as other suitable heating means may be provided.

The conveying means comprises two endless link chains 21 carried by drive sprockets 22 and tail sprockets 23. Attached at intervals to the chains 21 are plates 24, upon which are slidably mounted the rabble arms 25. Attached at intervals to the rabble arms 25 are rabbles 26 for rabbling the charge and for advancing it through the reducing chamber. These plows are of two kinds, the center ones are V shaped, while the side plows of each group are half-V shaped and are inclined to the direction of travel so as to force the charge away from the baffles 27. The rabbles are spaced across the rabble arms 25 and so mounted that they plow furrows in the charge, the rabbles on successive bars being placed so as to plow through the elevations formed in the charge by the preceding plows. The shape of the rabbles, their speed of travel and their number are such that the charge is conveyed and agitated at a proper rate to effect the reduction of the charge and to prevent local overheating with its danger of sintering. Also mounted upon the rabble arms 25 adjacent the end plows are gate opening means 28. As these gate opening means come into contact with gates 8 and 9 as well as gate 29 in the discharge zone 7, the gates are raised to permit passage of the plows and their associated supporting elements. The plates 24 are fastened to the links of the chain in any suitable manner, or may constitute links of the chain. Baffles 27 protect the chain from direct radiation while travelling through the reducing chamber.

The rabbles and the rabble supporting elements, however, are necessarily exposed to the full heat of the reducing chamber and means are provided for adequately cooling these elements to prevent sintering brought about by overheating of these elements with the resultant mechanical difficulties. When sintering occurs due to overheating of the rabbling means, the operation of the conveying mechanism is interfered with and other mechanical difficulties are encountered due to sticking and the building up of a layer of hard sintered material on the hearth. For example, the rabbles may ride so high that the rabble bars tear out the heating elements.

To this end a sealed return chamber 33 is provided, which, in the form of apparatus shown, is placed beneath the reducing chamber and is separated therefrom to provide an opening or air space 34. The return chamber is thus exposed to the air on its top, bottom and sides. The walls of the return chamber are formed of heat conducting metal and heat is dissipated by radiation as well as convection. End bays 35 and 36 are provided for the drive sprocket 22 and tail sprocket 23 respectively, so that the return chamber is sealed and the conveyor mechanism is at all times sealed against the air. Moreover by thus sealing the various chambers it is possible to maintain a positive pressure throughout the apparatus, whether solid reducing agents or gaseous ones are employed, and thereby preventing the inflow of any oxidizing or cooling atmosphere into the apparatus. This is very important in that it prevents the formation of explosive mixtures in the apparatus. The inflow of cool air or other gas also causes precipitation of carbon black where carbon containing reducing agents are employed and would seriously interfere with the efficiency of the reduction.

The arrangements of the parts also results in maintaining a slightly lower, though still positive, pressure in the return chamber. The gates 8, 9 and 29, when opened allow some of the gases to flow out of the reducing chamber into the bays 35 and 36 and thence into the return chamber. There is thus maintained a non-oxidizing positive pressure atmosphere in the return chamber and bays 35 and 36. The gates, however, sufficiently retard the flow of gases to keep the reducing chamber at a higher pressure than the return chamber.

The positioning of the return chamber below the reducing chamber also helps to maintain a lower temperature in the return chamber and incidentally also aids in maintaining a suitable temperature in the reducing chamber, since there is a tendency for the hotter gases to rise. The return chamber could, however, be placed above the reducing chamber, where suitable cooling can be effected and construction problems permit. The excess reducing gases are discharged from the low pressure point 37 in the return chamber.

The amount of cooling should preferably be such that the conveyor elements at no time reach such a temperature that the charge or the reduced material will stick or adhere thereto. In the construction shown no additional cooling means are needed. When carbon containing reducing agents are used it is also preferable to keep the conveyor elements below about 1200° F. to prevent any carburizing action thereon.

A water cooled screw conveyor 38 is provided in the discharge end of the reducing chamber into which the reduced material drops from the hearth. Any other suitable means of conveying reduced material away from the furnace and for cooling it to room temperature out of contact with oxygen to prevent oxidation may be employed. It is desirable to cool the reduced material as rapidly as possible, particularly in the case of iron, and to keep it from the air until it has been sufficiently cooled to prevent reoxidation. To this end the discharge conveyor is exposed to the reducing gases from the furnace.

Any suitable reducing agent may be used. Where solid carbonaceous reducing agents are used they may be mixed with the material to be reduced such as iron oxide. Where reducing gases are used they may be introduced by any suitable means. In the production of sponge iron or iron powder the temperature of the reduction will, of course, be below the melting point of iron and should be below the point at which substantial sintering occurs. The suitable temperature range is from 1400° F. to 1850° F., preferably the higher temperatures.

In Figure III is illustrated another modification of the invention, particularly suitable when employing a gaseous carbonaceous reducing agent. The exhaust furnace heating gases still contain a considerable amount of heat and it is desirable to make use of this heat. To this end the gases from the flues 20 are collected in an exhaust manifold 201, and are then conveyed to a gas generator and heat exchanger 202. In this gas generator, the exhaust gases are employed to preheat a charge of solid carbonaceous material used for the production of reducing gases. The cooled exhaust gases are then discharged by means of conduit 203, and the hot reducing gases are conveyed by means of conduit 204 to the furnace where they are suitably introduced into the furnace for the reduction of the charge therein.

Alternatively the hot furnace heating exhaust gases may be simply used to pre-heat cold reducing gases to be introduced into the furnace by any suitable heat exchange device.

The operation of the furnace in connection with the production of sponge iron from iron oxide mixed with a carbonaceous reducing agent will be described.

The furnace is first heated to the required temperature during which time a reducing atmosphere is maintained in the furnace. During the preliminary heating period the conveying mechanism is operated to prevent overheating any unreduced material present in the furnace from a previous run, being discharged and reworked. The hopper 1 is charged with iron oxide, and where a solid carbonaceous reducing agent is to be used it may conveniently be mixed with the iron oxide charge. Throughout the operation a sufficient amount of material is maintained in the hopper to act as an effective seal to prevent inflow of air into the furnace. When the desired temperature is reached in the furnace the feed 2 is put into operation. Preheating of the charge is effected by radiation to the hopper 1 and in the preheating zone 6 so that by the time the charge is introduced into the reducing chamber proper it is at or near reduction temperatures and before it has progressed very far in the reducing chamber it is substantially at the furnace temperature. The rabbles moving through the furnace agitate the charge upon the hearth and advance it through the reducing chamber. Due to the heat conducting nature of the hearth and the insulating effect of the charge, the hearth is relatively cool and sticking and sintering of the charge on the hearth is prevented.

The number of rabble arms 25 with their associated rabbles 26, the shape (contours) of rabbles and rate of travel of the rabbling means are so regulated so as to properly agitate the charge, to convey it through the furnace in such a time as to complete the reduction, and to prevent overheating of the conveying mechanism. If too many rabbles are used or the rate of travel is too fast the charge will not be properly reduced. If the rate of travel is too slow the conveying mechanism may become overheated and sticking result. Too slow a rate of travel also results in inefficient operation. When using a reducing gas as the reducing agent more frequent rabbling may be necessary than when a solid reducing agent is employed.

The rate of travel and number of rabbles, however, should be kept at the minimum consistent with obtaining complete reduction so as to avoid heat losses due to the conveying and agitating elements carrying heat out of the reducing chamber.

As the charge nears the end of the reducing zone it should be substantially completely reduced, and the reduced charge is pushed from the discharge end of the hearth and is conveyed away from the furnace where it is cooled before being exposed to the air.

The rabbles and their associated supporting elements are cool as they enter the reducing chamber. During their passage through the reducing chamber they pick up heat, but do not attain a sufficiently high temperature to cause sticking, and do not reach as high a temperature as that of the charge. During the return of the rabbling means through the return chamber they and their associated supporting elements give up an appreciable amount of the heat acquired in the reducing chamber, which heat is dissipated from the walls of the return chamber. In addition the conveying mechanism may be cooled with water or by means of jets of inert or reducing gases.

The charge introduced upon the stationary hearth is uniformly advanced longitudinally through the furnaces by the linearly travelling rabbling and conveyor means, and as a result it is maintained at a uniform depth longitudinally of the furnace, except for the swelling of the charge incident to the low temperature reduction. At the same time the rate of travel of each rabble and the rate of advance and the degree of rabbling is uniform throughout the whole charge. Also the charge is maintained stationary except when being rabbled with the result that more uniform heating of the charge is possible. The charge is also of substantial uniform thickness transversely of the furnace, the only irregularities being the furrows formed by the rabbles. There is, however, no piling up or tendency for the charge to pile up at any point in the furnace.

Due to the uniform conditions, local overheating, incomplete reduction as a result of local accumulation of the charge, etc., are prevented, and this, together with the provision of means for preventing any sticking to the rabbles, is believed to be the cause of the freedom from mechanical difficulties and for the high purity of the product.

The reduced iron discharged from the furnace is in the form of a mixture of discrete iron particles and agglomerates in the form of a soft iron sponge which can readily be broken up in one's fingers. It contains a small amount of free carbon and generally a small amount of silica if silica is present in the initial charge. After removal of free carbon and non-magnetic material a product consistently containing as much as 98% free iron has been produced by the apparatus described.

By employing an apparatus of the type described, long continuous operation without sticking or mechanical difficulties due to sintering is possible and the form of apparatus shown has been operated continuously for several weeks without encountering mechanical difficulties and with the consistent production of high purity iron powder.

It is to be understood that modifications and variations may be made in the form of apparatus illustrated without departing from the spirit and scope of the invention.

Having described the invention what is desired to be secured by Letters Patent is:

1. In an apparatus of the type described, a reducing chamber having a stationary hearth, continuously traveling rabbling means movable through the reducing chamber, a sealed return chamber for the rabbling means separated from the reducing chamber by an air space, connecting means between the reducing chamber and the return chamber through which the rabbling means pass, means for continuously feeding a charge of material to be reduced to the hearth, means for continuously conveying the charge through the reducing chamber and over the hearth, and means for continuously removing the reduced material from the reducing chamber.

2. In an apparatus of the type described, a reducing chamber having a stationary hearth, heating means in the reducing chamber, continuously traveling rabbling means movable through the reducing chamber, a sealed return chamber for the rabbling means separated from the reducing chamber by an air space, connecting means between the ends of the reducing chamber and the ends of the return chamber through which the rabbling means pass, means for continuously feeding a charge of material to be reduced to the hearth at one end of the reducing chamber, means for continuously removing reduced material from the other end of the reducing chamber, and means for continuously conveying the charge through the reducing chamber and over the hearth.

3. The apparatus of the preceding claim in which the rabbling means comprises the means for conveying the charge through the reducing chamber.

4. In an apparatus of the type described, a reducing chamber having a stationary hearth, heating means in the reducing chamber, continuously traveling rabbling means movable through the reducing chamber, a sealed return chamber for the rabbling means separated from the reducing chamber by an air space, connecting means between the ends of the reducing chamber and the ends of the return chamber through which the rabbling means pass, means for continuously feeding a charge of material to be reduced to the hearth at one end of the reducing chamber, means for continuously removing reduced material from the other end of the reducing chamber, means for continuously conveying the charge through the reducing chamber and over the hearth, and means for maintaining a lower temperature in the return chamber than in the reducing chamber.

5. In an apparatus of the type described, a reducing chamber having a stationary hearth, heating means in the reducing chamber, continuously traveling rabbling means movable through the reducing chamber, a sealed return chamber for the rabbling means separated from the reducing chamber by an air space, connecting means between the ends of the reducing chamber and the ends of the return chamber through which the rabbling means pass, means for continuously feeding a charge of material to be reduced to the hearth at one end of the reducing chamber, means for continuously removing reduced material from the other end of the reducing chamber, means for continuously conveying the charge through the reducing chamber and over the hearth, and means for maintaining a positive pressure in both the reducing chamber and the return chamber.

6. In an apparatus of the type described, a reducing chamber having a stationary hearth, heating means in the reducing chamber, continuously traveling rabbling means movable through the reducing chamber, a sealed return chamber for the rabbling means separated from the reducing chamber by an air space, connecting means between the ends of the reducing chamber and the ends of the return chamber through which the rabbling means pass, means for continuously feeding a charge of material to be reduced to the hearth at one end of the reducing chamber, means for continuously removing reduced material from the other end of the reducing chamber, means for continuously conveying the charge through the reducing chamber and over the hearth, means for maintaining a positive pressure in both the return chamber and the reducing chamber and means for maintaining a slightly higher pressure in the reducing chamber than in the return chamber.

7. In an apparatus of the type described, a reducing chamber having a stationary hearth, heating means in the reducing chamber, continuously traveling rabbling means movable through the reducing chamber, a sealed return chamber for the rabbling means separated from the reducing chamber by an air space, connecting means between the ends of the reducing chamber and the ends of the return chamber through which the rabbling means pass, means for continuously feeding a charge of material to be reduced to the hearth at one end of the reducing chamber, means for continuously removing reduced material from the other end of the reducing chamber, means for continuously conveying the charge through the reducing chamber and over the hearth, and means for maintaining a lower temperature in the return chamber than in the reducing chamber.

8. In an apparatus of the type described, a reducing chamber, means for heating said reducing chamber, means for maintaining a reducing atmosphere throughout said reducing chamber, a stationary hearth in the reducing chamber, continuously traveling rabbling means movable over the hearth and movable into and out of said reducing chamber, means outside of the reducing chamber to cool the rabbling means and means for sealing the reducing chamber at all times from the atmosphere.

9. In a continuously operating reducing furnace, a reducing chamber, a hearth in said reducing chamber, rabbling means for agitating a charge upon said hearth, continuously traveling conveying means for conveying said charge through the reducing chamber, a sealed return chamber for said conveying means separate from the reducing chamber, means for cooling said return chamber and the conveying means while in said return chamber, and means for cooling the hearth.

DAVID N. BURRUSS, Jr.
JOSEPH E. DRAPEAU, Jr.